United States Patent [19]

Rafferty

[11] Patent Number: 4,973,081
[45] Date of Patent: Nov. 27, 1990

[54] DIELOCK ANGLE VARIATION WITHIN FOAM-IN-PLACE INFLATABLE RESTRAINT DOOR

[75] Inventor: Scott Rafferty, Dover, N.H.
[73] Assignee: Davidson Textron Inc., Dover, N.H.
[21] Appl. No.: 463,132
[22] Filed: Jan. 10, 1990
[51] Int. Cl.$^5$ .............................................. B60R 21/16
[52] U.S. Cl. .................................... 280/732; 280/728
[58] Field of Search ............... 280/728, 730, 731, 732, 280/743, 752; 180/90; 296/70

[56] References Cited

U.S. PATENT DOCUMENTS

| | | | |
|---|---|---|---|
| 3,801,126 | 4/1974 | Knight, IV et al. | 180/90 |
| 3,822,894 | 7/1974 | Muller et al. | 280/731 |
| 3,966,227 | 6/1976 | Cameron | 180/90 |
| 4,327,937 | 5/1982 | Scholz et al. | 180/90 |
| 4,893,833 | 1/1990 | DiSalvo et al. | 280/728 |
| 4,925,209 | 5/1990 | Sakurai | 280/732 |

Primary Examiner—Charles A. Marmor
Assistant Examiner—Tamara L. Finlay
Attorney, Agent, or Firm—John C. Evans

[57] ABSTRACT

An instrument panel and associated inflatable restraint door, capable of producing a "hinging effect" preferential opening of the door upon deployment of an air bag concealed in the instrument panel, has locating peripheral surfaces with a dielock angle which is flared five degrees along one edge and between fifteen and twenty degrees along the opposite edge to impove door release action.

8 Claims, 2 Drawing Sheets 4,973,081

DIELOCK ANGLE VARIATION WITHIN FOAM-IN-PLACE INFLATABLE RESTRAINT DOOR

TECHNICAL FIELD

This invention relates to inflatable restraint systems for an automotive vehicle including a foam-in-place restraint door which covers an air bag. The door is opened when the inflatable restraint is deployed to protect the occupants of the automotive vehicle during collision.

BACKGROUND ART

Automobile inflatable restraint systems are known in which air bags are associated with instrument panels or other interior parts for deployment into the passenger compartment during vehicle collisions.

An air bag is an envelope, usually concealed behind a door in an automobile's instrument panel. During an automobile collision, the air bag fills with a gas and rapidly expands.

The air bag pushes outwardly against the door as it expands causing the door to open. The air bag then passes through the opening and into the passenger compartment. Once in the passenger compartment the air bag continues to expand forming a cushion between the passengers and dashboard or windshield.

During the above process it is essential that the door concealing the air bag does not interfere with the air bag's deployment or harm the passengers. Thus, the door must release and move clear of the bag, and the passengers, with sufficient speed to permit unfettered deployment of the air bag.

U.S. Pat. No. 3,801,126 to Knight, IV et al shows an example of an inflatable restraint system and an associated door. The door in this patent has a hinge which guides the door out of the way of the expanding air bag and away from the passengers. One problem with such systems is that the hinge must be separately connected to a support member. Also the hinge structure adds to the cost of the system.

The present invention differs from the prior art in that the present invention does not utilize a hinge to control the direction of the inflatable restraint door when the air bag expands. Eliminating the hinge simplifies installation. Eliminating the hinge also means fewer parts are used in the automotive vehicle. This lowers the overall weight of the vehicle resulting in fuel savings.

The air bag force that is imparted to the door of the present invention is controlled by an integral part of the door to cause it to be directed away from the passengers and toward the windshield.

SUMMARY OF THE INVENTION AND ADVANTAGES

The subject invention provides an instrument panel for an automotive vehicle comprising the panel defining an opening therein for overlying an air bag assembly and a door having a first edge and a second edge opposite to the first edge for closing said opening, the instrument panel being characterized by a means for guiding the door out of the opening in response to a uniformly applied force over the area of the inside of the door and for retaining one edge of the door in the opening until the other edge clears the opening to produce a free and independent upwardly pivotal movement of the door away from the panel.

Accordingly, the subject invention provides an inflatable restraint door configured to be guided in a specific manner to produce hinged separation movement of the door from the panel without the use of a separate hinge part.

FIGURES IN THE DRAWINGS

Other advantages of the present invention will be readily appreciated as the same becomes better understood by reference to the following detailed description when considered in connection with the accompanying drawings.

DETAILED DESCRIPTION OF THE DRAWINGS

Figure 1:
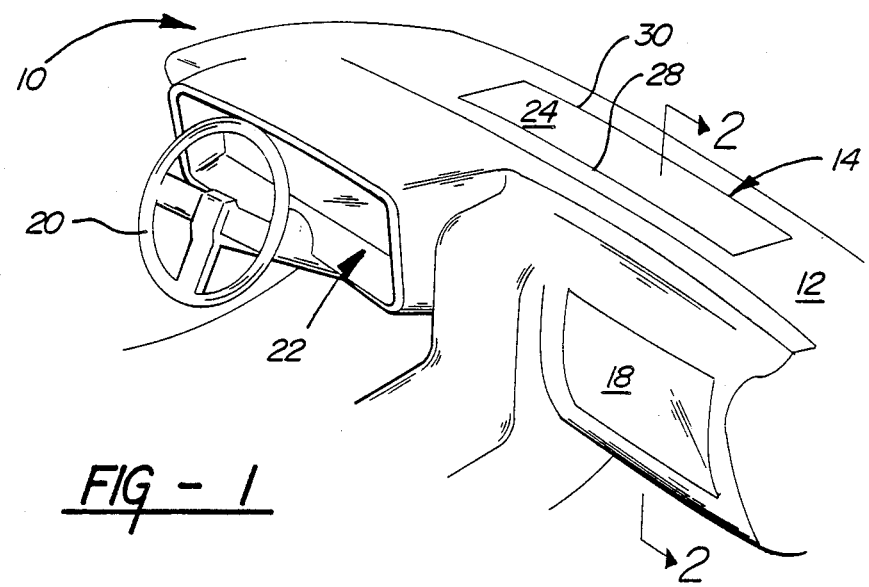
FIG. 1 is a perspective view of an instrument panel including the present invention.

An instrument panel assembly for an automotive vehicle is generally shown at 10 in FIG. 1. The instrument panel assembly 10 includes a cover 12 with an opening 14 therein overlying an air bag assembly 16. The air bag assembly 16 is disposed behind a door 24 in the instrument panel assembly 10. It is on the opposite side of the instrument panel assembly 10 from the interior of the automobile. The instrument panel assembly 10 is representatively shown as being associated with a glove box 18, a steering wheel 20 and an array of vehicle instrumentation 22.

Figure 2:
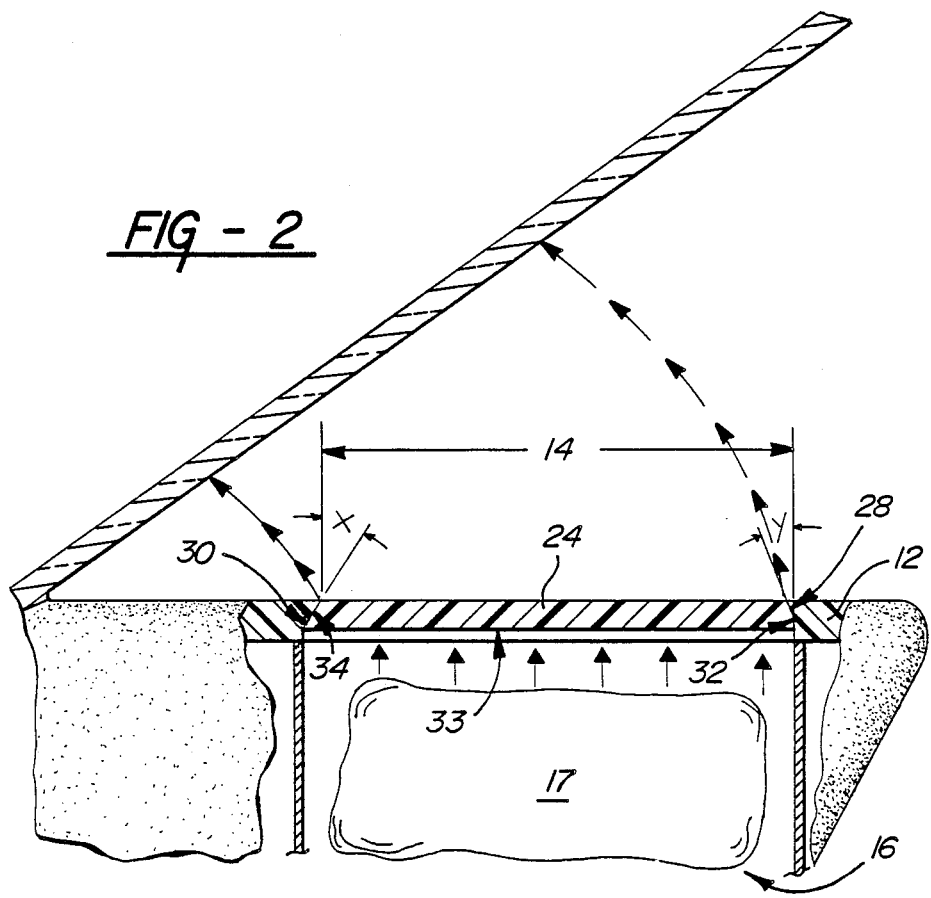
FIG. 2 is an enlarged fragmentary sectional view taken along the line 2—2 of FIG. 1 looking in the direction of the arrows to show a portion of the instrument panel containing the restraint door of the present invention.

The door 24 has at least a first edge 28 and a second edge 30, opposite to the first edge, which respectively engage mating coacting surfaces 32, 34 on the cover 12 to close the opening 14 best shown in FIG. 2. The actual shape of the door 24 is dictated by design, and economic considerations. For purposes of illustration the door 24 shown in FIGS. 3 and 4 has four sides; these are the preferred configurations. The ultimate goal is the ability of the air bag 17 to emerge from its deflated stored position and into the passenger compartment of the automobile in a very short period of time.

The instrument panel assembly 10 is characterized by a guide means or assembly for guiding the door 24 out of the opening 14 in response to a uniformly applied force, illustrated by the large arrows in FIG. 2, over the area of the inside 33 of the door 24. The force will be applied by engagement of the air bag 17 with the inside surface 33 of the door 24 when the air bag assembly 16 deploys.

The guide means consists of dielock angles X and Y on the door edges 28, 30 and their mating coacting surfaces 32, 34 between the door 24 and the surrounding instrument panel 22. More specifically, in operation the guide means have angles X and Y selected so the second edge 30 of the door 24 will be retained in the opening 14 until the first edge 28 clears the opening 14. Thereafter, the surface 30 defines a pivotal point about which the door 24 swings upwardly of the panel 10, allowing free and independent movement of the door.

The preferred embodiment of the instrument panel assembly 10 is defined by the first edge 28 being a coacting peripheral surface flared outwardly at a dielock angle of five degrees (5°) around the periphery thereof and the second edge 30 being a second coacting peripheral surface flared outwardly at a dielock angle of between fifteen and twenty degrees (15° and 20°), inclusive, around the periphery thereof.

Figure 3:
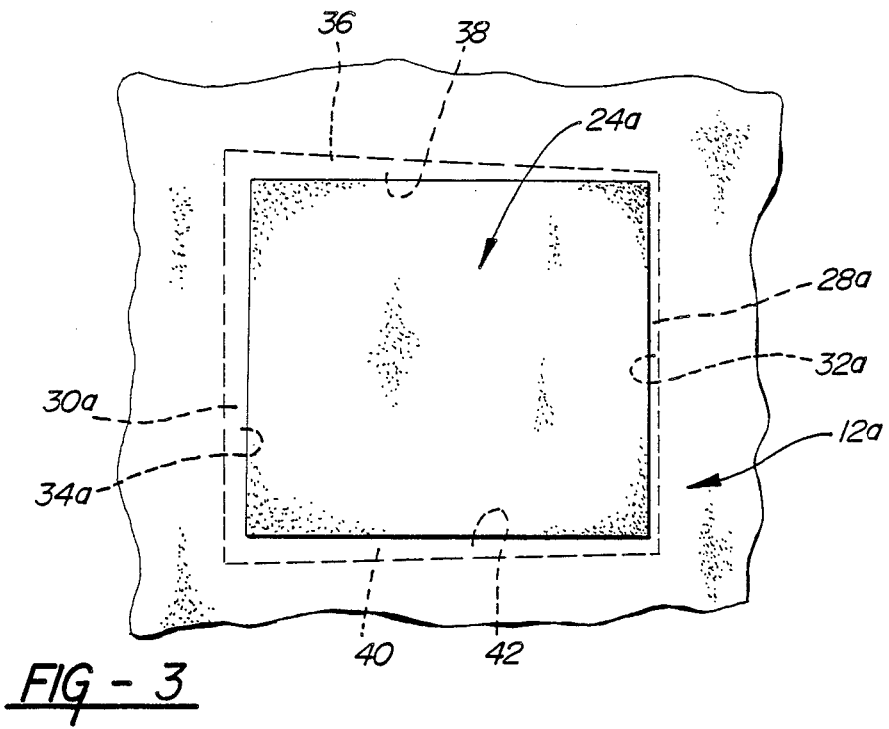
FIG. 3 is a top elevational view of the inflatable restraint door with a varied dielock angle around the circumference of the door.

In the embodiment of FIG. 3 an instrument panel 10 has a door 24a having four sides each with dielocked surfaces 28a, 30a, 36, 40 which coact respectively with surfaces 32a, 34a, 38 and 42 on a cover 12a. The additional coacting surfaces would have dielock angles that would be modified from that found in FIG. 4. The dielock angle between coacting surfaces 36, 38 and 40, 42 could be tapered from five degrees (5°) near the first edge 28a to fifteen to twenty degrees (15°–20°) near the second edge 30a. This would enhance the ability of the door's 24 first edge 28a to clear the opening prior to the door's 24 second edge 30a.

Figure 4:
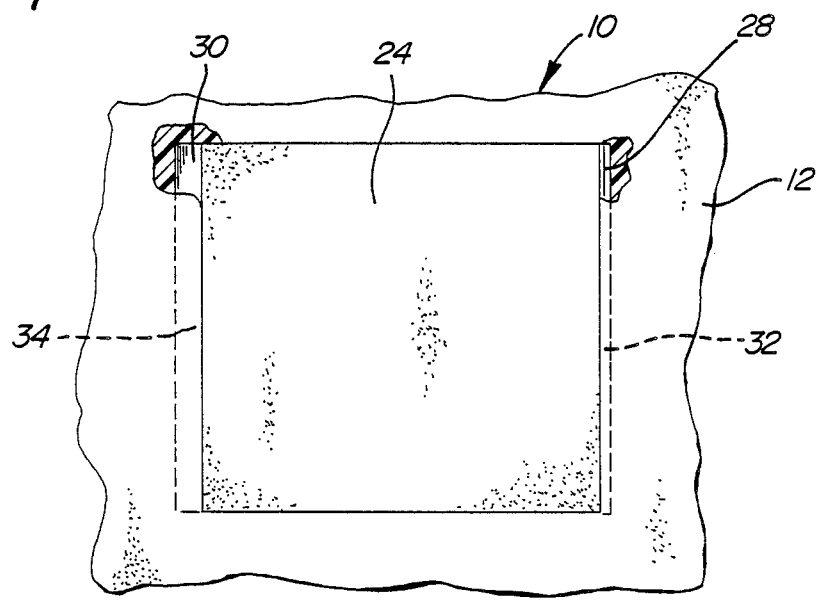
FIG. 4 is a top elevational view, partially sectional of the inflatable restraint door with a varied dielock angle on two ends of the door.

FIG. 4 is an elevational view of the instrument panel assembly 10 and door 24 shown in FIG. 3. They are further defined by the coacting peripheral surfaces 34, 32 being flared outwardly at a dielock angle around the periphery of the door 24. The dielock angle of the coacting peripheral surfaces 32, 34 vary.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An instrument panel for an automotive vehicle comprising
   said panel defining an opening therein for overlying an air bag assembly,
   a door having a first edge and second edge opposite to said first edge for closing said opening,
   said instrument panel being characterized by guide means for guiding said door out of said opening in response to a uniformly applied force over the area of one side of said door and for retaining said second edge in said opening until said first edge clears said opening while thereafter allowing free and independent movement of said door apart from said panel.

2. An instrument panel as set forth in claim 1 further defined by said door and said opening having coacting peripheral surfaces.

3. An instrument panel as set forth in claim 2 further defined by said coacting peripheral surfaces being flared outwardly at a dielocked angle around the periphery thereof.

4. An instrument panel as set forth in claim 3 further defined by said coacting peripheral surfaces being flared outwardly at a dielock angle which varies around the periphery thereof.

5. An instrument panel as set forth in claim 4 further defined by said first edge being a coacting peripheral surface flared outwardly at a dielock angle of five degrees around the periphery thereof.

6. An instrument panel as set forth in claim 4 further defined by said second edge being a coacting peripheral surface flared outwardly at a dielock angle of fifteen to twenty degrees.

7. An instrument panel as set forth in claim 4 further defined by said first edge being a coacting peripheral surface flared outwardly at a dielock angle of five degrees around the periphery thereof and said second edge being a second coacting peripheral surface flared outwardly at a dielock angle of between fifteen and twenty degrees, inclusive, around the periphery thereof.

8. An instrument panel as set forth in claim 3 further defined by said door having four sides.

* * * * *